(12) United States Patent
Klein et al.

(10) Patent No.: US 11,429,072 B2
(45) Date of Patent: Aug. 30, 2022

(54) METHOD AND DEVICE FOR COMPUTER-ASSISTED DETECTION OF BUILDING AUTOMATION PARAMETERS OF A BUILDING

(71) Applicant: Siemens Schweiz AG, Zürich (CH)

(72) Inventors: Wolfram Klein, Neubiberg (DE); Benjamin Lee, Munich (DE)

(73) Assignee: SIEMENS SCHWEIZ AG

( * ) Notice: Subject to any disclaimer, the term of this patent is extended or adjusted under 35 U.S.C. 154(b) by 190 days.

(21) Appl. No.: 16/757,681

(22) PCT Filed: Oct. 17, 2018

(86) PCT No.: PCT/EP2018/078337
§ 371 (c)(1),
(2) Date: Apr. 20, 2020

(87) PCT Pub. No.: WO2019/081288
PCT Pub. Date: May 2, 2019

(65) Prior Publication Data
US 2020/0264569 A1    Aug. 20, 2020

(30) Foreign Application Priority Data
Oct. 26, 2017  (DE) .......... 10 2017 219 239

(51) Int. Cl.
*G05B 13/04*  (2006.01)
*H04L 12/28*  (2006.01)

(52) U.S. Cl.
CPC .......... *G05B 13/042* (2013.01); *G05B 13/048* (2013.01); *H04L 12/2825* (2013.01)

(58) Field of Classification Search
CPC .......... G05B 13/042; G05B 13/048; G05B 2219/2642; G05B 15/02; H04L 12/2825
See application file for complete search history.

(56) References Cited

U.S. PATENT DOCUMENTS

| | | |
|---|---|---|
| 2012/0046796 A1 | 2/2012 | Zhang |
| 2015/0127165 A1 | 5/2015 | Quam et al. |
| 2016/0004805 A1* | 1/2016 | Drees ............... G06Q 50/08 703/2 |

FOREIGN PATENT DOCUMENTS

EP    3038294 A1    6/2016

OTHER PUBLICATIONS

PCT International Search Report and Written Opinion of International Searching Authority dated Jan. 29, 2019 corresponding to PCT International Application No. PCT/EP2018/078337 filed Oct. 17, 2018.

\* cited by examiner

*Primary Examiner* — Tejal Gami
(74) *Attorney, Agent, or Firm* — Schmeiser, Olsen & Watts LLP

(57) ABSTRACT

Provided is a method and a device for computer-assisted detection of building automation parameters of a building, wherein a first building automation having first building automation parameters is determined for the building, which first building automation is based on one or more classes of respectively local parameters. The classes of local parameters include at least one first class of static building data of the building, a second class of current weather data for the location of the building, and a third class of prior building automation parameters of the building. The first building automation parameters are adapted depending on a number of classes of distant parameters of at least one predecessor building, which is situated at a location that is different from the location of the building. The number of classes of distant parameters at the location or for the location of the respective predecessor building is determined.

15 Claims, 1 Drawing Sheet

$G_6 \sim \bigcirc$ $G_{G6} = (PG1, ..., PGn)$
$W_{G6} = (PW1, ..., PWp)$
$GAP_{G6} = (PGAP1, ..., PGAPm)$
$E_{G6} = (PE1, ..., PEo)$ $G_1 \sim \bigcirc$ $G_{G1} = (PG1, ..., PGn)$
$W_{G1} = (PW1, ..., PWp)$
$GAP_{G1} = (PGAP1, ..., PGAPm)$
$E_{G1} = (PE1, ..., PEo)$

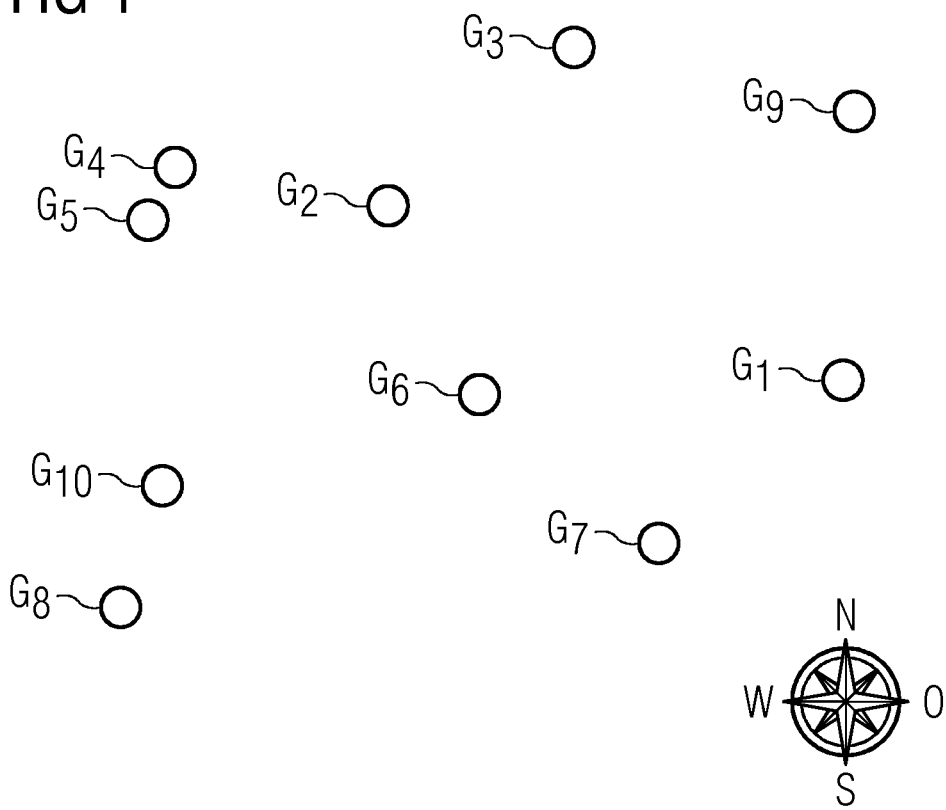

METHOD AND DEVICE FOR COMPUTER-ASSISTED DETECTION OF BUILDING AUTOMATION PARAMETERS OF A BUILDING

CROSS-REFERENCE TO RELATED APPLICATIONS

This application claims priority to PCT Application No. PCT/EP2018/078337, having a filing date of Oct. 17, 2018, which is based off of DE Application No. 10 2017 219 239.9, having a filing date of Oct. 26, 2017, the entire contents both of which are hereby incorporated by reference.

FIELD OF TECHNOLOGY

The following relates to a method and to a device for computer-assisted determination of building automation parameters of a building.

BACKGROUND

Building automation parameters of a building are used to perform closed-loop control of the behavior of a building with respect to heating, air conditioning, shading, illumination, ventilation and the like. The objective of the building automation is to achieve a high level of energy efficiency and energy economy and at the same time maximize the comfort for the user of the building by means of building automation parameters which are used for closed-loop control. The building automation parameters are processed, and determined on the basis of data of the building which is determined by sensor, in order to perform open-loop control of a heating system, of an air conditioning system, of a sunshade device (e.g. blinds), lights, fans and the like. For this purpose, e.g. one or more temperature sensors, moisture sensors, incident sunlight sensors (e.g. sunshine sensor and/or sunshine duration sensor, optionally with a light sensor arranged behind it), wind sensors, light sensors and the like are distributed around the building.

Basically, with an increasing number of sensor data which can be processed it is possible to improve the closed-loop control by means of the building automation to the effect of minimizing the energy consumption of the building. However, as the number of sensors installed in the building increases, the costs for the production of the building and maintenance of the sensors increase in an undesired way.

SUMMARY

An aspect relates to specify a method and a device for computer-assisted determination of building automation parameters of a building, with which method and device a more energy-efficient building automation process is made possible.

A method for computer-assisted determination of building automation parameters of a building is proposed. In this method, a first building automation operation is determined for the building with first building automation parameters which are based on one or more classes of respective local parameters. Local parameters are parameters which are determined at the location of the building, such as e.g. parameters determined by means of sensors of the building. Local parameters also include parameters which are or have been determined for the location of the building, e.g. by simulation or calculation.

The one or more classes of local parameters comprise at least a first class of static building data of the building and/or a second class of current weather data for the location of the building and/or a third class of, in particular, previously applicable building automation parameters of the building.

The static building data are understood to be parameters which characterize the building with respect to its size, the building materials used, building automation units located in the building (e.g. the type, model and size of a heating device and/or air conditioning device), the type and size of a sunshade device (e.g. blinds) and the like, insulation materials, insulation properties and so on.

Current weather data for the location of the building comprise weather information which is acquired, e.g. by means of sensors of the building, or are valid at the current time, and weather information which is predicted for a predefined time period in the future. The weather data can be acquired locally at the location of the building or in the vicinity of the building or can be determined by means of simulation. The weather data can likewise be provided by one or more weather services for the location of the building. The term "location of the building" is not strictly limited here to the exclusive area of the building but rather comprises the location in the wider sense, e.g. a town, a part of a town or a region or an area surrounding the location of the building.

The building automation parameters constitute parameters which are used to perform closed-loop control of the building automation operation.

The first building automation parameters are adapted as a function of a number of classes of remote parameters of at least one predecessor building which is located at a different location than the location of the building. The number of classes of remote parameters is determined at or for the location of the respective predecessor building. The number of classes of remote parameters comprises at least the second class of current and/or previously applicable weather data at the respective location of the at least one predecessor building.

The term "location of the predecessor building" or "different location" is not strictly limited to the exclusive area of the respective predecessor building but rather comprises the location in the wider sense, e.g. a town, a part of a town or a region or an area surrounding the location of the predecessor building.

The adaptation of the first building automation parameters is carried out on the basis of previously determined scaling factors between the classes of respective local parameters and the corresponding classes of remote parameters at the respective location of the at least one predecessor building.

In addition, a device for computer-assisted determination of building automation parameters of a building is proposed, which device is configured to determine for the building a first building automation operation with first building automation parameters which are based on one or more classes of respective local parameters. The one or more classes comprise at least a first class of static building data of the building and/or a second class of current weather data for the location of the building and/or a third class of previously applicable building automation parameters of the building.

The device is also configured to adapt the first building automation parameters as a function of a number of classes of remote parameters of at least one predecessor building which is located at a different location than the location of the building. The number of classes of remote parameters at or for the location of the respective predecessor building is determined, wherein the number of classes of remote parameters comprises at least the second class of current and/or previously applicable data at the respective location of the at least one predecessor building.

The device is furthermore configured to carry out the adaptation of the first building automation parameters on the basis of previously determined scaling factors between the classes of respective local parameters and the corresponding classes of remote parameters at the respective location of the at least one predecessor building.

The procedure underlying embodiments of the invention is based on the fact that in order to determine the building automation parameters of the building on which closed-loop control is to be performed not only the information which is present at the or for the location of the building is used but also in addition data from other buildings is processed in order to improve the closed-loop control of the building. The adaptation of the first building automation parameters is based on the concept that the parameters which are present in a predecessor building and which are used to determine building automation parameters of the respective predecessor building permit, given a known relationship between the building on which closed-loop control is to be performed and the predecessor building, improved automation of the building by adapting the first building automation parameters. As a result, it is not necessary for the building on which closed-loop control is to be performed to be provided with additional sensors. Instead, the data which is present from other buildings (the predecessor buildings) or is determined by calculation or simulation is used to adapt the building automation parameters. As a result, a "prediction", made possible in this way, of the closed-loop control of the building on which closed-loop control is to be performed permits the energy consumption of the building on which the closed-loop control is to be performed to be minimized.

In particular, the weather data and/or the weather forecast for the building on which closed-loop control is to be performed are/is adapted by means of the weather data and/or of the weather forecast for the at least one predecessor building. By means of this procedure it is possible to improve the weather forecast in future with the weather which is present at the location of the predecessor building and the relationship of which to the weather at the building on which closed-loop is to be performed is known by means of one or more scaling factors. As a result, for example weaknesses in the weather forecast for the building on which closed-loop control is to be performed, which generally originates from weather services, can be improved on the basis of measured data which has been obtained at the location of the at least one predecessor building.

A further optimization of the first building automation parameters of the first building automation operation results from the fact that the number of classes of remote parameters also comprises the first class of static building data of the at least one predecessor building. As a result, effects relating to necessary or consumed energy for the building on which closed-loop control is to be performed can be predicted more precisely on the basis of the already acquired data of the at least one predecessor building. This prediction can then be included in the adaptation of the first building automation parameters.

It is also expedient if, as an alternative or in addition to the first class of static building data of the at least one predecessor building, the number of classes of remote parameters comprises the third class of previously applicable building automation parameters of the at least one predecessor building. From this information it is then possible to derive which building automation parameters of the predecessor building have achieved what effect, e.g. with respect to the consumed energy and therefore the efficiency, at the predecessor building. This knowledge can be in turn used to adapt the first building automation parameters in order to improve the efficiency of the building.

It can also be expedient if the number of classes of remote parameters comprises, as alternative or in addition, a fourth class of building effects which are caused by second building automation parameters of the at least one predecessor building. As a result, the already described efficiency of the building automation parameter used for the closed-loop control of the predecessor building is taken into account.

A combination of all these classes of remote parameters therefore makes it possible to optimize the first building automation parameters with respect to minimum energy consumption of the building on which closed-loop control is to be performed. It is expedient if the scaling factors are determined between classes of respectively local parameters and the corresponding classes of remote parameters for the location of the building and one or more predecessor buildings at such other locations which satisfy a predefined similarity measure/similarity criterion. In other words, a similarity measure/similarity criterion is examined for pairs of buildings, wherein one of the buildings of the pairs of buildings is always the building on which closed-loop control is to be performed. When the method described above is carried out, only predecessor buildings which are similar to the building on which closed-loop control is to be performed, expressed by the similarity measure/similarity criterion, are then taken into account.

A further expedient configuration provides that the first class of static building data of the class of local parameters of the building and/or the class of remote criteria of the at least one predecessor building comprises one or more of the following parameters:

a type of building, e.g. residential building, office building, industrial building (if appropriate divided for the production of different goods), warehouse, etc.;

a purpose of use of the building, e.g. production, storage, etc.;

a location of the building expressed by continent and/or the country in which the building is situated, and/or a degree of longitude and degree of latitude and/or a climatic zone in which the building is situated;

an orientation of the building in the cardinal direction, in order to be able to take into account the influence of the sun or of the position of the sun on the temperature prevailing in the interior of the building;

areas of external walls and/or roof and/or basement, in order to be able to take into account heat gains and/or heat losses, instants of light or the like;

materials from which the building is constructed, in order to be able to determine heat gains and heat losses; and insulation values of external walls and/or roof and/or basement, in order to be able to determine heat gains and heat losses.

A further expedient configuration of the method provides that the third class of building automation parameters of the building and/or the third class of building automation parameters of the predecessor building comprises one or more of the following parameters:

closed-loop control parameters of the building, in particular acquired over time, which serve to perform open-loop/closed-loop control of a heating system, of an air conditioning system, of a sunshade device (e.g. blinds), of an air moisture level, of the illumination and the like; and energy consumption data of the building, in particular acquired over time, in order to be able to determine the consumption of current or of a primary energy source for the heating of spaces.

A further expedient configuration provides that the building and the at least one predecessor building are similar or comparable with respect to one or more of the following criteria:

a geographic location, in particular a degree of latitude, wherein there is similarity when the degree of latitude of the at least one predecessor building lies within a predefined bandwidth around the degree of latitude of the building on which closed-loop control is to be performed. An expedient predefined bandwidth around the degree of latitude of the building can be e.g. ±30 angular minutes (corresponding to the traditional sexagesimal system), wherein a half degree of latitude corresponds more or less to approximately 110 km around the location under consideration;

country, in order to be able to relate user habits of the users of the building on which closed-loop control is to be performed and of the predecessor building which is considered for adaptation. In particular, buildings are considered which lie in the same country or in countries with similar user habits;

type of building, in order to be able to establish comparability with respect to the use as an office building, production building or storage building;

orientation of building, in order to be able to take into account the influence of the sun or of the position of the sun on the internal temperature and/or on the instance of light; and average weather conditions, in order to be able to make a simple adaptation of the first building automation parameters, in particular in the case of similar weather conditions.

A further expedient configuration of the method according to embodiments of the invention provides that the scaling factors are determined between classes of respective local parameters for the location of the building and the corresponding classes of remote parameters for the other location or locations of the predecessor building or buildings, in that the at least one local parameter and the at least one corresponding remote parameter are respectively standardized, and a ratio is formed between the standardized values of the respectively corresponding parameters, as a result of which a ratio value is determined for each parameter. The ratio value can then be processed in order to adapt the first building automation parameters in conjunction with the class or classes of remote parameters of the at least one predecessor building.

It is expedient if a successor relationship between, in each case, two buildings is formed from the ratio values of the parameters related to buildings and/or the building automation parameters and/or the building effects and/or the weather. The determination of the successor relationship, which is carried out in advance and, in particular, once before the method according to embodiments of the invention is carried out, permits specific predecessor buildings from a multiplicity of potential possible predecessor buildings to be taken into account in a targeted fashion. As a result, the method which is to be performed for adapting the first building automation parameters can be speeded up.

A further expedient configuration provides that a difference between the time at which the weather characterized by the currently acquired weather data occurs at the location of the at least one predecessor building and the time at which it occurs at the location of the building (on which closed-loop control is to be performed) is determined. The currently acquired weather data of the building, the weather predicted for the location of the building, the acquired weather data of the at least one predecessor building and the determined difference in time with respect to refined forecast weather data for the location of the building are expediently processed.

By means of this configuration variant, the weather at the location of a predecessor building, which is determined or predicted by means of measuring technology, and the knowledge as to how long the weather present there will take to reach the location of the building on which closed-loop control is to be performed can be used for the adaptation of the first building automation parameters. In this context, in particular local characteristics which affect the weather on the way to the location of the building and which are taken into account by one or more scaling factors can be taken into account in the processing of the weather data. Likewise, using the scaling factors, effects on the weather which are conditioned by the time of day can also be taken into account until the location of the building on which closed-loop control is to be performed is reached.

A further expedient refinement provides that the adaptation of the first building automation parameters is carried out on the basis of the effects, standardized by the ratio value, of the at least one predecessor building and of the building.

Embodiments of the invention also propose a computer program product (non-transitory computer readable storage medium having instructions, which when executed by a processor, perform actions) which can be loaded directly into the internal memory of a digital computer and comprises software code sections with which the steps of the method described herein are executed when the product runs on a computer. The computer program product can be present in the form of a CD-ROM, a DVD, a USB memory stick or a signal which can be loaded via a network in a wireless or wired fashion.

BRIEF DESCRIPTION

Some of the embodiments will be described in detail, with reference to the following figures, wherein like designations denote like members, wherein:

FIG. 1 shows a schematic illustration of buildings which are distributed over various locations; and FIG. 2 shows a schematic illustration of a subset of the buildings illustrated in FIG. 1 whose locally determined parameters are processed in order to adapt building automation parameters of a building on which closed-loop control is to be performed.

DETAILED DESCRIPTION

FIG. 1 shows a schematic illustration of a multiplicity of geographically distributed buildings $G_1, \ldots, G_{10}$. In the schematic illustration, for example ten buildings $G_1, \ldots, G_{10}$ are illustrated, wherein for the execution of the method described below basically more or fewer, but at least two buildings can be taken into account. Geographic distribution of the buildings $G_1, \ldots, G_{10}$ is to be understood as meaning positional distribution in various cardinal directions, wherein the buildings $G_1, \ldots, G_{10}$ can be distributed in one country, in a plurality of countries, in a climatic zone or in a plurality of climatic zones and the like.

The buildings $G_1, \ldots, G_{10}$ may be identical or different types of buildings, such as e.g. office buildings, production buildings, storage buildings or other buildings. The buildings $G_1, \ldots, G_{10}$ can have the same or a different extent with respect to their footprint, floor areas and the like. They can have the same shape of roof (pitched roof, flat roof, etc.) or have a different shape of roof. Likewise, the building materials which are used to produce the buildings $G_1, \ldots, G_{10}$ can be formed from the same or different substances. It is therefore possible for example, to construct individual buildings or a plurality of the buildings from bricks, while other buildings can comprise a concrete structure with glass front elements. Depending on the building materials used, the buildings $G_1, \ldots, G_{10}$ have different heat transmission coefficients of their walls, windows and of their roof.

In the method described below, a building automation process with building automation parameters $GAP_{G1}$ is to be determined for the building $G_1$ (also referred to as the building on which closed-loop control is to be performed). Generally, any building $G_i$ of the buildings $G_1, \ldots, G_{10}$ could be the building on which closed-loop control is to be performed.

The building $G_1$ has, as the building on which closed-loop control is to be performed, a number of sensors with which the state of the building (temperature of one or more rooms, the state of sunshade devices (e.g. blinds opened, closed, degree of opening and the like), the state of the doors (opened or closed), the state of windows (closed, window casements opened, window casements tilted), energy consumption values of a heating system and/or of an air conditioning system, temperature setpoint specifications for a desired room temperature and the like can be acquired. The values which are acquired by the sensors are used to determine building automation parameters $GAP_{G1}$.

In addition to the data which are acquired by sensor, static, i.e. invariable building data $G_{G1}$ of the building $G_1$ which therefore only have to be determined once, are taken into account for the determination of the building automation parameters $GAP_{G1}$. The building data Gm comprise a number of parameters which describe the building $G_1$, e.g. by means of one of more of the following parameters: its size, its heat transfer coefficients, areas of external walls, windows, the roof and basement, the insulation quality of external walls, windows and roof.

Moreover, weather parameters of current weather data $W_{G1}$ for the location of the building $G_1$ on which closed-loop control is to be performed are included in the determination of the building automation parameters $GAP_{G1}$ of the building $G_1$ on which closed-loop control is to be performed. The current weather data comprise weather information which is acquired by sensor at a given time or, e.g. by weather services. Moreover, the weather data can also comprise weather information which is predicted for the future.

Since the building automation of the building $G_1$ on which closed-loop control is to be performed operates as an (open or closed) closed-loop circuit, in addition to the static building data $G_{G1}$ and the permanently acquired weather data currently valid and previously applicable building automation parameters $GAP_{G1}$ of the building $G_1$ on which closed-loop control is to be performed are processed as further parameters. The building automation operation with determined building automation parameters $GAP_{G1}$ produces building effects which result from the abovementioned parameters and the current ambient conditions and which comprise, in particular as a parameter, an amount of energy which is necessary or consumed in order to achieve a desirable value of the building on which closed-loop control is to be performed.

The prediction of the necessary or consumed amount of energy is dependent, in particular, on the static building data $G_{G1}$ as well as the current weather data $W_{G1}$ at the location of the building $G_1$ and the weather forecast for the future. The accuracy of the forecast of the amount of energy which is then necessary or consumed is therefore dependent on the accuracy of the weather data $W_{G1}$ as well as on the quality of an optimization method which is used to determine the building automation parameters $GAP_{G1}$.

In order to determine (optimize) the building automation parameters $GAP_{G1}$ of the building $G_1$, on which closed-loop control is to be performed, with respect to a minimum energy consumption, according to the method proposed according to embodiments of the invention not only the local parameters which are specified above for the building $G_1$ on which closed-loop control is to be performed are taken into account but additionally remote parameters of at least one further building are used. These buildings are referred to in the present description as predecessor buildings $G_j$, wherein the index j comprises predecessor buildings taken into account in the method from the total number of buildings $G_2, \ldots, G_{10}$ which are available by way of example.

For each of the buildings $G_2, \ldots, G_{10}$ it is also assumed that they have a building automation operation and therefore corresponding sensors for acquiring the state of the building. Therefore, for each of the buildings $G_1, \ldots, G_{10}$ it is also possible to determine a number of parameters, but for different locations.

The total number of parameters which are determined for the building $G_1$ and each predecessor building $G_j$ is divided into four different classes here.

A first class $G_{Gx}$ comprises the parameters $PG1, \ldots, PGn$ of static building data for a respective building $G_x$ (wherein x=1 to 10 according to FIG. 1). The second class $G_{Gx}$ of parameters comprises the current weather data $PW1, \ldots, PWp$ for the location of the respective building $G_x$. A third class $G_{Gx}$ of parameters comprises building automation parameters $GAP_{Gx}$ for the respective building $G_x$. The fourth class $G_{Gx}$ of parameters comprises building effects $PE1, \ldots, PEo$ which are caused by the building automation parameters $GAP_{Gx}$. The suffixes n, m, o, p are each natural positive numbers which specify the respective number of parameters per class.

The first class $G_{Gx}$ of parameters comprises, for example, one or more of the following parameters:
- a type of building, (e.g. office building, production building, storage building, etc.);
- a purpose of use of the building (office building with open plan offices, office building with small offices, production building for the construction of heavy machinery, construction of machines, electrical products, storage for products to be cooled, storage for other products, etc.);
- a location of the building expressed through the continent and/or the country in which the building $G_x$ is located and/or by means of a degree of longitude and a degree of latitude and/or a climatic zone in which the building is located;
- an orientation of the respective building $G_x$ with respect to a cardinal direction (in order to be able to be able to determine the areas subjected to solar radiation over the day as well as solar gains);
- areas of external walls and/or roof and/or basement, if appropriate divided according to the cardinal direction;
- materials from which the building $G_x$ is constructed, in order to be able to determine heat gains and heat losses; and insulation values of external walls and/or roof and/or basement, in order to be able to determine heat gains and heat losses.

The second class $W_{Gx}$ of parameters comprises current weather data for the location of the building $G_x$ under consideration, in particular a temperature, an air moisture level, a position of the sun, solar radiation, cloud coverage, rain, quantity of rain, etc.

The third class $GAP_{Gx}$ of parameters comprises closed-loop control parameters of the housing such as e.g. setpoint data for a heating system or an air-conditioning system, control data for shading devices, a setpoint value specification for an air moisture level etc. Moreover, the third class $GAP_{Gx}$ of a respective housing comprises energy consumption data of the building as parameters. The building automation parameters are acquired, in particular, over time.

The fourth class $E_{Gx}$ of parameters comprises parameters relating to a necessary or consumed use of energy in order to achieve a desired state of a respective building $G_x$ on which closed-loop is to be performed, by means of building automation.

Since the determination of the building automation parameters $GAP_{G1}$ of the building $G_1$ on which closed-loop control is to be performed is carried out by means of an optimization method, there is expediently provision that not all the parameters of all the predecessor buildings $G_2, \ldots, G_{10}$ are taken into account but rather only the totality of the parameters of such predecessor buildings $G_j$ which have a specific similarity to the building $G_1$ on which closed-loop control is to be performed, in terms of their static building data and with respect to the weather data. For this purpose, firstly buildings which are similar to or comparable to the building $G_1$ on which closed-loop control is to be performed are found, specifically with respect to one or more of the following criteria:

a geographic location, in particular a degree of latitude. Similarity is present if the degree of latitude of the predecessor building lies within a predefined bandwidth, e.g. ±30 angular minutes (corresponding to the traditional sexagesimal system) around the degree of latitude of the building $G_1$ on which closed-loop control is to be performed;

the country, since it is then possible to assume a similar user behavior or user perception e.g. owing to national regulations or laws;

a type of building; and an orientation of the building.

In the present exemplary embodiment, it is assumed that the building $G_1$ on which closed-loop control is to be performed and the building $G_6$ are similar since they lie on a comparable degree of latitude in the West-East direction and comparable average weather conditions are present.

Average weather conditions can be acquired and compared on the basis of historical specific weather observations. For example, for this purpose solar radiation, specific cloud shading, a specific wind strength, a determined temperature, a determined quantity of precipitation can be acquired at predetermined time intervals, evaluated over time and compared. Comparable measures can be, for example, similar average temperatures, similar quantities of moisture, similar wind strengths, the same direction of wind, comparable duration of sunshine and quantity of precipitation. Moreover, in the present exemplary embodiment it is assumed that the buildings $G_1$ and $G_6$ are located in the same country, which indicates the same use conditions. The type of building and orientation of the building can be the same or different from one another.

In the further description, reference is now also made to the two buildings $G_1$ and $G_6$ which are illustrated with their four classes of parameters highlighted in FIG. 2. The method described below could be repeated in a corresponding way for further pairs between the building $G_1$ on which closed-loop control is to be performed, on another predecessor building $G_j$.

For the building $G_1$ on which closed-loop control is to be performed and the predecessor building $G_6$, scaling factors are now determined between the respective classes of the local parameters for the location of the building $G_1$ and the corresponding classes of the remote parameters for the predecessor building $G_6$. For this purpose, a respective local parameter, e.g. PG1 of the first class $G_{G1}$ of the building $G_1$ can be standardized with the corresponding parameter PG1 of the first class $G_{G6}$ of the predecessor building $G_6$, wherein a ratio is formed between the standardized values of the respective corresponding parameters, in order to determine a ratio value for each parameter. If, for example, the building $G_1$ on which closed-loop control is to be performed comprises an area of 1000 qm, while the area of the building $G_6$ is merely 500 qm, the ratio value for the parameter PG1 is 1000 qm/500 qm=2. If the duration of the sunshine at the building $G_6$ (expressed for example by the parameter PW1 of the second class $WG_6$)=8 h, while the duration of the sunshine of the building $G_1$ on which closed-loop control is to be performed is merely 7.5 h, a ratio value of 7.5 h/8 h=0.9375 is determined.

This procedure is repeated for all the parameters of all of the classes of parameters. Moreover, a difference between the time at which the weather which is characterized by the currently acquired weather data occurs at the location of the predecessor building $G_6$ and the time at which it occurs at the location of the building $G_1$ is determined. On the basis of an exemplary distance of 200 km between the building $G_6$ which lies further to the West and the building $G_1$ on which closed-loop control is to be performed, a time difference of, for example, two hours is determined. Moreover, differences in the sunrise and sunset as well as the time of acquisition of the parameters can also be taken into account.

As a result, a relative comparison between the differences between the building $G_1$ on which closed-loop control is to be performed and the predecessor building $G_6$ can therefore be determined. In this context, in a first version it is possible to assume that for the totality of the parameters of the respective four classes there is in each case only one relative comparison value. In a second version, there can be a corresponding comparison value for each parameter of the respective four classes. In a third embodiment, these comparison values can also be dependent on the time (time of day or time of year). This information is subsequently used to adapt the building automation parameters $GAP_{G1}$ of the building $G_1$ on which closed-loop is to be performed, using the parameters which are acquired by the predecessor building $G_6$ or determined for the predecessor building $G_6$.

The method for computer-assisted determination of the building automation parameters $GAP_{G1}$ of the building $G_1$ on which closed-loop control is to be performed is carried out, in particular, iteratively in that firstly the building automation parameters $GAP_{G1}$ of the building $G_1$ are determined on the basis of the first class $G_1$ of static building data of the building $G_1$ on which closed-loop control is to be performed, the second class $W_{G1}$ of current weather data for the location of the building $G_1$ on which closed-loop control is to be performed and the third class $GAP_{G1}$ of current and/or previously applicable building automation parameters of the building $G_1$ on which closed-loop control is to be performed. Moreover, parameters of the optimization method used and a starting value of the optimization method are utilized.

Subsequently, the first building automation parameters $GAP_{G1}$ resulting from the optimization method are adapted by improving the parameters of the weather data $W_{G1}$ with the weather data of the predecessor building $W_{G6}$. The parameters of the building data $W_{G6}$ of the predecessor building $G_6$ can optionally also be taken into account by taking the previously determined scaling factors into account.

The quality of the building automation parameters $GAP_{G1}$, which are to be determined, of the building $G_1$ on which closed-loop control is to be performed can also be improved with the objective of minimum energy consumption if the starting value of the optimization method takes into account not only the parameters of the building automation parameters $GAP_{G1}$ but also the building automation parameters $GAP_{G6}$ of the predecessor building G at the time which precedes by a time equal to the previously applicable time step. The previously determined scaling factor is also used here.

Finally, a further improvement is achieved by virtue of the fact that the building effects $E_{G1}$ of the building $G_1$ on which closed-loop control is to be performed and $E_{G6}$ of the predecessor building G are additionally processed using the scaling factors which were previously taken into account. In this context, the processing is carried out in such a way that the building effects $E_{G6}$ of the predecessor building $G_6$ are taken into account at the time in the past which the weather took to reach the location of the building $G_1$ on which closed-loop control is to be performed.

The implementation can be carried out by extrapolation of the parameters of the predecessor building $G_1$ or by using covariance matrices if specific parameters are influenced by other parameters of the predecessor building $G_6$ (e.g. if the state of the position of the blinds is influenced by the interior lighting).

As a result, use is made of the knowledge from data, already available from sensors or determined by simulation/calculation, of a predecessor building which lies in a similar time zone to the building on which closed-loop control is to be performed, in that the prevailing weather at the predecessor building and the building automation parameters which result therefrom for the building on which closed-loop control is to be performed are projected into the future. In particular, this makes predicted determination of the building automation parameters possible.

Therefore, for example if strong solar radiation is to be expected in future at the building on which closed-loop control is to be performed, it is possible to actuate the air conditioning system predictively in such a way that when the strong solar radiation occurs said air conditioning system has already brought about a reduction in the room temperature. In the opposite case, if, for example, a rain front is to be expected in future at the building on which closed-loop control is to be performed, owing to the weather which has been currently sensed at the predecessor building, the air conditioning can be predictively reduced and, if appropriate, a heating device can be activated.

As a result, on the one hand increased efficiently is possible in respect of the automation of the building on which closed-loop control is to be performed, and on the other hand the well-being of the users of the building can be increased through predictive open-loop control.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-assisted control of building automation parameters of a building, comprising:
    determining a first building automation operation for the building with first building automation parameters which are based on one or more classes of respective local parameters, at least comprising:
        a first class of static building data of the building,
        a second class of current weather data for the location of the building,
        a third class of previously applicable building automation parameters of the building,
    adapting the first building automation parameters as a function of a number of classes of remote parameters of at least one predecessor building which is located at a different location than the location of the building, wherein the number of classes of remote parameters is determined at or for the location of the respective predecessor building, and wherein the number of classes of remote parameters at least comprises:
        the second class of current and/or previously applicable weather data at the respective location of the at least one predecessor building,
    wherein the adaptation of the first building automation parameters is carried out on the basis of previously determined scaling factors between the classes of respective local parameters and the corresponding classes of remote parameters at the respective location of the at least one predecessor building; and
    controlling a behavior of the building using the adapted first building automation parameters.

2. The method as claimed in claim 1, in which the number of classes of remote parameters also comprises:
    the first class of static building data of the at least one predecessor building.

3. The method as claimed in claim 1, in which the number of classes of remote parameters also comprises:
    the third class of previously applicable building automation parameters of the at least one predecessor building.

4. The method as claimed in claim 1, in which the number of classes of remote parameters also comprises:
    a fourth class of building effects which are caused by second building automation parameters of the at least one predecessor building.

5. The method as claimed in claim 1, in which the scaling factors are determined between classes of respectively local parameters and the corresponding classes of remote parameters for the location of the building and one or more predecessor buildings at such other locations which satisfy a predefined similarity measure/similarity criterion.

6. The method as claimed in claim 1, in which the first class of static building data of the class of local parameters of the building and/or of the class of remote criteria of the at least one predecessor building comprises one or more of the following parameters:
    a type of building;
    a purpose of use of the building;
    a location of the building expressed by continent and/or the country in which the building is situated, and/or a degree of longitude and degree of latitude and/or a climatic zone in which the building is situated;
an orientation of the building in the cardinal direction;
areas of external walls and/or roof and/or basement;
materials from which the building is constructed; and
insulation values of external walls and/or roof and/or basement.

7. The method as claimed in claim 1, in which the third class of building automation parameters of the building and/or of the class of building automation parameters of the predecessor building comprises one or more of the following parameters:
closed-loop control parameters of the building, in particular acquired over time; and
energy consumption data of the building, in particular acquired over time.

8. The method as claimed claim 1, in which the building and the at least one predecessor building are similar/comparable with respect to one or more of the following criteria:
a geographic location, in particular a degree of latitude, wherein there is similarity when the degree of latitude of the at least one predecessor building lies within a predefined bandwidth around the degree of latitude of the building;
country;
type of building;
orientation of building; and
average weather conditions.

9. The method as claimed in claim 1, in which the scaling factors are determined between classes of respective local parameters for the location of the building and the corresponding classes of remote parameters for the other location or locations of the predecessor building or buildings, in that the at least one local parameter and the at least one corresponding remote parameter are respectively standardized, and a ratio is formed between the standardized values of the respectively corresponding parameters, as a result of which a ratio value is determined for each parameter.

10. The method as claimed in claim 9, in which a successor relationship between, in each case, two buildings is formed from the ratio values of the parameters related to at least one of buildings and the building automation parameters and the building effects (EG, and EGj) and the weather.

11. The method as claimed in claim 1, in which a difference between the time at which the weather characterized by the currently acquired weather data occurs at the location of the at least one predecessor building and the time at which it occurs at the location of the building is determined.

12. The method as claimed in claim 11, in which the currently acquired weather data of the building, the weather predicted for the location of the building, the acquired weather data of the at least one predecessor building and the determined difference in time are processed to produce refined predicted weather data for the location of the building.

13. The method as claimed in claim 9, in which the adaptation of the first building automation parameters is carried out on the basis of the effects, standardized by the ratio value, of the at least one predecessor building and of the building.

14. A computer program product, comprising a computer readable hardware storage device having computer readable program code stored therein, said program code executable by a processor of a computer system to implement a method which is loaded directly into the internal memory of a digital computer and comprises software code sections with which the steps as claimed in claim 1 are executed when the product runs on a computer.

15. A device for computer-assisted determination control of building automation parameters of a building, which is configured
to determine for the building a first building automation operation with first building automation parameters which are based on one or more classes of respective local parameters, at least comprising:
a first class of static building data of the building,
a second class of current weather data for the location of the building, and
a third class of previously applicable building automation parameters of the building,
to adapt the first building automation parameters as a function of a number of classes of remote parameters of at least one predecessor building which is located at a different location than the location of the building, wherein the number of classes of remote parameters is determined at or for the location of the respective predecessor least comprises:
the second class of current and/or previously applicable weather data at the respective location of the at least one predecessor building,
to carry out the adaptation of the first building automation parameters on the basis of previously determined scaling factors between the classes of respective local parameters and the corresponding classes of remote parameters at the respective location of the at least one predecessor building;
wherein a behavior of the building is controlled using the adapted first building automation parameters.

* * * * *

UNITED STATES PATENT AND TRADEMARK OFFICE
CERTIFICATE OF CORRECTION

| | |
|---|---|
| PATENT NO. | : 11,429,072 B2 |
| APPLICATION NO. | : 16/757681 |
| DATED | : August 30, 2022 |
| INVENTOR(S) | : Wolfram Klein et al. |

It is certified that error appears in the above-identified patent and that said Letters Patent is hereby corrected as shown below:

In the Claims

Column 14 Claim 15, Line 1, delete "control"

Signed and Sealed this
Seventh Day of March, 2023

Katherine Kelly Vidal
*Director of the United States Patent and Trademark Office*